Oct. 13, 1931.   C. P. ALBERT   1,827,060
TRUNK LOCKING DEVICE
Filed March 29, 1930
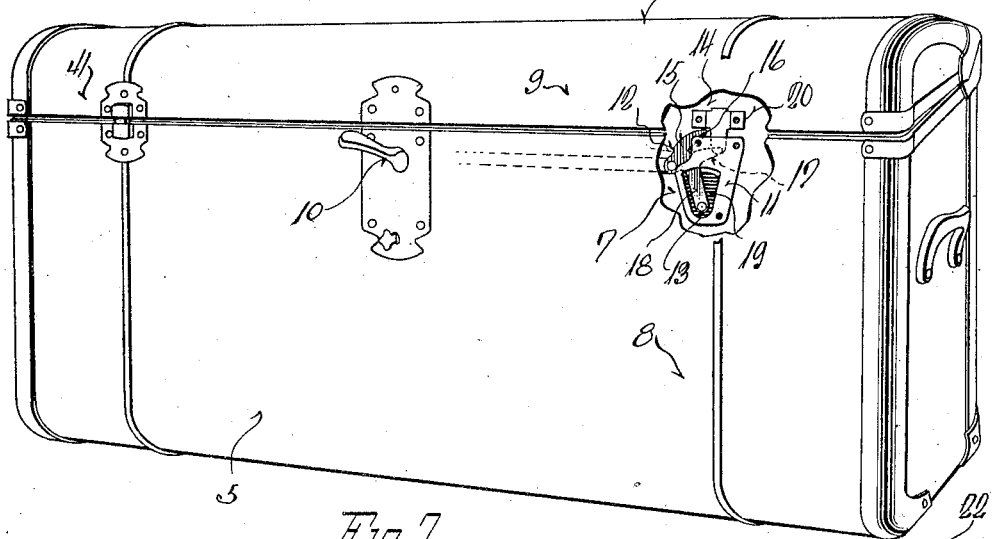
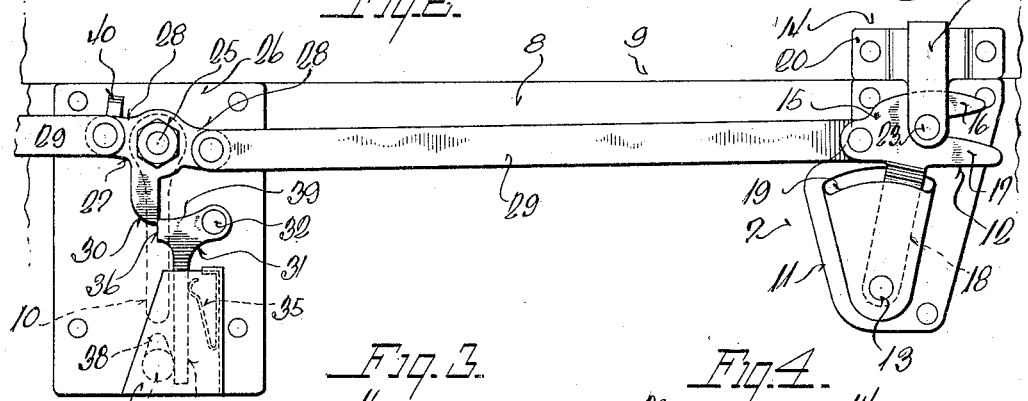
Inventor
Carl P. Albert Patented Oct. 13, 1931

1,827,060

UNITED STATES PATENT OFFICE

CARL P. ALBERT, OF RACINE, WISCONSIN, ASSIGNOR TO GREENE MANUFACTURING COMPANY, OF RACINE, WISCONSIN, A CORPORATION OF WISCONSIN

TRUNK LOCKING DEVICE

Application filed March 29, 1930. Serial No. 439,952.

This invention relates to certain new and useful improvements in locking devices for trunks, particularly the type adapted to be mounted on the rear of automotive vehicles and the like.

The means heretofore employed for securing the covers of trunks of this type closed, have been objectionable, as they required the use of two hands in opening and closing, and due to their necessary construction did not lend themselves readily to graceful pleasing design.

It is, therefore, an object of this invention to provide simple means whereby the lid or cover of a trunk of the character described may be secured closed at spaced points, preferably near the ends of the trunk, by a single medially located actuating device.

Another object of this invention resides in the provision of a locking device for trunks of the character described wherein the actual mechanism is mounted inside the trunk, so as not to detract from its exterior appearance.

It is also an object of this invention to provide a locking structure especially adapted for trunks of the type secured to automotive vehicles, wherein a single actuating member positively draws the cover closed and forces the same open.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a perspective view of a trunk adapted to be mounted on the rear of an automotive vehicle or the like and illustrating my invention applied thereto;

Figure 2 is an enlarged detail view illustrating the locking mechanism as seen from the inside of the trunk;

Figure 3 is a perspective detail view of one of the pivoted latches, and

Figure 4 is a perspective view of one of the keepers with which the latches are engageable.

Referring now more particularly to the accompanying drawings, the numeral 5 represents the main section of a trunk particularly adapted to be carried at the rear of an automotive vehicle and 6 the lid or cover thereof which is hingedly connected with the main section along its upper rear portion.

The meeting edges of the cover and main section are provided with the usual inter-engaging balances and the cover is adapted to be secured closed by two latch structures 7, mounted on the inner front walls 8 and 9 of the main section and cover respectively adjacent the ends of the trunk. The latch members are controlled from a centrally located handle 10 in a manner to be later described, to be simultaneously operated upon actuation of the handle.

The latch members 7 are identical in construction except that they are reversed, and each has a plate 11 secured to the front wall 8 of the main section to pivotally mount a latch 12, as at 13. The latches 12 are engageable with keepers 14 secured to the front wall 9 of the cover directly above the plates 11, and as best illustrated in Figures 2 and 3, have enlarged heads 15 bifurcated to provide upper and lower arms 16 and 17, respectively. Off-set extensions 18 projected downwardly from the enlarged heads to be received in pockets formed by pressing a portion of the plates 11 outwardly, as at 19, are riveted to the walls of the pockets to form the pivotal mounting 13 for the latches.

The keepers 14 are preferably stamped from a single piece of bendable metal and have attaching portions 20 from which arms 21 project downwardly and off-set arms 22 spaced from and parallel with the arms 21. The lower ends of the arms are connected by rivets 23 whose medial portions form bearings for rollers 24 confined between the arms. The rollers 24 facilitate the engagement of the bifurcated ends of the latch members with the keepers, as will be readily apparent.

When it is desired to secure the cover section closed, the latches 12 are actuated to engage their upper arms 16 over the rollers 24 which draws the cover tightly into engagement with the main section, movement of the latches as hereinbefore stated, resulting from actuation of the centrally located handle 10.

The handle 10 is freely rotatably mounted from the front wall 8 of the main section and has its stem 25 extended through the wall and a plate 26 fixed to the rear face thereof to have a lever member 27 non-rotatably secured to its inner end. The lever member 27 has oppositely extending arms 28 the outer ends of which are connected one with each latch 12 through link members 29 freely pivotally connected at their opposite ends with the lever ends 28 and the enlarged heads 15 of the latches. Hence, it is seen that as the handle 10 is rotated, the latches 12 are simultaneously actuated to their closed or open positions.

During opening movement of the latches by actuation of the handle 10, the lower arms 17 engage the rollers 24 of the keepers and forcibly raise the lid or cover sufficiently to break the usually tight seal at the juncture of the cover with the main section.

It is noted that inasmuch as both latches 12 are actuated simultaneously, the closing and opening of the cover will be effected without warping the same which very often occurred where independent locking means were provided at the ends of the cover section, for in such instances, especially during opening, one end of the trunk is very often forced open before the other.

To enable the trunk cover to be locked in closed position, the lever 27 has a downwardly extending projection 30 whose lower end is engageable with a locking member 31 pivotally mounted from the plate 26, as at 32. The locking member 31 has an arm 33 extended downwardly into a casing 34 carried by the plate 26 and in which a spring 35 is mounted to normally yieldably urge the locking member 31 in a direction engaging its end 36 with the lower end of the projection 30. A key controlled locking cylinder 37 suitably mounted in the wall 8 of the main section and having a cam or the like 38 disposed within the casing 34 to be engageable with the extension 33 of the locking member, enables the same to be swung about its pivot 32 against the action of the spring 35 to move its end 36 out of the path of the extension 30 and permit free and unrestricted movement of the lever 27 by the handle.

It is noted that the upper end of the locking member 31 has a curved surface 39. This permits rotation of the lever 27 by the handle to effect closing of the trunk after the key controlled cylinder has been turned to its locking position illustrated in Figure 2.

In the event it is desired not to employ the key controlled locking means, for securing the cover closed, means are provided to prevent accidental disengagement of the latches by the normal vibration to which a trunk of the character described is subjected. This is accomplished by permitting the lever 27 to rotate past dead center during its locking movement to engage a stop 40. Any tendency to disengage the latches 12 from their keepers thus merely tends to rotate the lever 27 in a direction abutting the stop.

If desired, tongues and sockets 41 may be mounted on the exterior surface of the walls 8 and 9 of the main section and cover respectively, directly in front of the latching devices 7. The provision of such means greatly enhances the external appearance of the trunk and further increases its rigidity.

From the foregoing description, taken in connection with the accompanying drawings, it will be readily apparent to those skilled in the art to which an invention of the character described appertains, that I provide a novel trunk locking means which is particularly adaptable to trunks of the type mounted at the rear of automotive vehicles and the like, wherein positive means are provided for drawing the cover tightly closed and forcing it open during the initial opening movement, and wherein such means is actuated from a centrally located handle member to be simultaneously operated. It is also obvious that by mounting the locking mechanism within the trunk its exterior appearance is not marred by mechanism which, due to its construction, cannot be of pleasing design.

What I claim as my invention is:

1. The combination with a trunk having a body portion and a cover therefor, of a plurality of locks, each lock comprising a U-shaped member having a roller mounted between the parallel legs thereof and secured to said cover, a forked member pivotally mounted on said body portion for engagement with said roller, the prongs of said forked member having a double cam action on said roller and acting to force the cover tightly on the body portion in locked position and partially open the cover during unlocking and actuating means to simultaneously lock and unlock both locks, said actuating means comprising a rotatable member having arms thereon cooperating with links pivotally connected to said arms and to said forked members to form a toggle joint whereby turning of said rotatable member actuates both locking means.

2. The combination with a trunk having a body portion and a cover therefor, of a plurality of locks, each lock comprising a U-shaped member having a roller mounted between the parallel legs thereof and secured to said cover, a forked member pivotally mounted on said body portion for engagement with said roller, the prongs of said forked member having a double cam action on said roller and acting to force the cover tightly on the body portion in locked position and partially open the cover during unlocking, actuating means to simultaneously lock and unlock both locks, said actuating means comprising a rotatable member having arms thereon cooperating with links pivotally connected to said arms and to said forked members to form a toggle joint whereby turning of said rotatable member actuates both locking means, and means to secure against accidental unlocking of said locks, comprising a stop member for said rotatable member placed beyond the dead center.

3. The combination with a trunk having a body portion, a cover therefor, of a plurality of locks, each lock comprising a U-shaped member having a roller mounted between the parallel legs of said U, secured to said cover, a forked member pivotally mounted at a point remote from the prongs of said fork and secured to said body portion for engagement with said roller, the prongs of said forked member having double cam action and acting to force the cover tightly upon the body portion in locked position and to partially open the lid during unlocking, and actuating means to simultaneously lock and unlock both locks, comprising a rotatable member having arms thereon cooperating with links pivotally connected to said arms and to said forked members to form a toggle joint whereby turning of said rotatable member actuates both locking means.

In testimony whereof I have hereunto affixed my signature.

CARL P. ALBERT.